United States Patent [19]
Gaiser

[11] 4,303,146
[45] Dec. 1, 1981

[54] QUICK TAKE-UP DISC BRAKE ASSEMBLY

[75] Inventor: Robert F. Gaiser, Stevensville, Mich.

[73] Assignee: The Bendix Corporation, Southfield, Mich.

[21] Appl. No.: 80,879

[22] Filed: Oct. 1, 1979

[51] Int. Cl.$^3$ .............................................. F16D 65/74
[52] U.S. Cl. ................................ 188/71.8; 188/196 A
[58] Field of Search ............. 188/71.8, 196 A, 196 C, 188/347, 351

[56] References Cited

U.S. PATENT DOCUMENTS

| 3,055,456 | 9/1962 | Pfeiffer | 188/196 A |
| 3,125,187 | 3/1964 | Dotto | 188/169 A |
| 3,353,637 | 11/1967 | Chana | 188/347 |

Primary Examiner—Duane A. Reger
Attorney, Agent, or Firm—Paul David Schoenle; Ken C. Decker

[57] ABSTRACT

A disc brake assembly includes a caliper movable relative to a rotor for the purpose of urging a pair of friction elements into engagement with the rotor. A housing of the caliper defines a stepped bore for receiving a piston which cooperates with the housing to form a pressure chamber within the stepped bore. A plate within the pressure chamber separate the pressure chamber into a pair of cavities and a valve assembly controls communication of fluid pressure to one of the pair of cavities and to the other cavity. During initial fluid pressure build-up in the caliper, the valve assembly remains in a first position to communicate fluid pressure to one of the cavities so that the plate and piston advance to a braking position at a first rate of speed. After the initial fluid pressure build-up when the fluid pressure reaches a predetermined value, the valve assembly is movable to a second position to communicate fluid pressure to the other cavity so that the piston is advanced at a second rate of speed less than the first rate of speed.

9 Claims, 3 Drawing Figures

U.S. Patent     Dec. 1, 1981     4,303,146

QUICK TAKE-UP DISC BRAKE ASSEMBLY

BACKGROUND OF THE INVENTION

A disc brake assembly includes a pair of friction elements which are movable by a piston and caliper assembly to a braking position in engagement with a rotor. The pair of friction elements are disposed adjacent the rotor in such proximity, generally, to drag against the rotating rotor. In order to prevent the pair of friction elements from dragging on the rotor, various retraction devices have been devised to hold the pair of friction elements in substantial clearance with the rotor. For example, in the past total clearance between the rotor and pair of friction elements has generally been maintained between five and fifteen thousandths. At present it is intended to generally maintain a total clearance between fifteen and thirty thousandths.

With the increased clearance between the pair of friction elements and the rotor, the piston within the caliper is required to move through an increased distance to fully engage the pair of friction elements with the rotor. Heretofore, a quick take-up or fast fill master cylinder is used to rapidly take up the increased clearance between the pair of friction elements and the rotor. Consequently, the response time for a full brake application remains substantially the same, even though the piston is required to travel through an increased distance.

SUMMARY OF THE INVENTION

The present invention relates to a disc brake assembly wherein a plate and a valve assembly are disposed within a pressure chamber to provide for quick take-up of the clearance between a pair of friction elements and a rotor. In particular, the plate separates the pressure chamber into a pair of cavities and the valve assembly is normally biased to a first position communicating fluid pressure to one of the pair of cavities. When the pressure within the one cavity reaches a predetermined value, the valve assembly is movable to a second position to communicate fluid pressure to the other cavity. Fluid pressure in the one cavity acts against the plate to move the plate and a piston relative to a caliper housing which forms the pressure chamber within a stepped bore. When the valve assembly moves to the second position, the fluid pressure within the one cavity is trapped and fluid pressure is communicated to the other cavity to advance the piston relative to the plate. In view of differences in diameter between the one cavity and the other cavity, the plate and piston advance at a faster rate in response to fluid pressure or fluid displacement within the one cavity than in response to fluid pressure or fluid displacement within the other cavity.

In further detail, the stepped bore forms a plurality of diameter sections. The piston sealingly engages a first diameter section and the plate sealingly engages the first diameter section and a small second diameter section. The valve assembly is normally biased to the first position wherein it is spaced from a third diameter section and engageable with a fourth diameter section, smaller than the third diameter section.

It a primary object of the present invention to provide a simple device within a disc brake assembly to enable a piston within the disc brake assembly to advance during initial brake application at a rate faster than during the remainder of the brake application.

It is another object of the present invention to dispose a plate and a valve assembly within a pressure chamber defined by a piston within a caliper. The plate and valve assembly cooperating to vary the rate of travel of the piston within the caliper.

DETAILED DESCRIPTION

Figure 1:
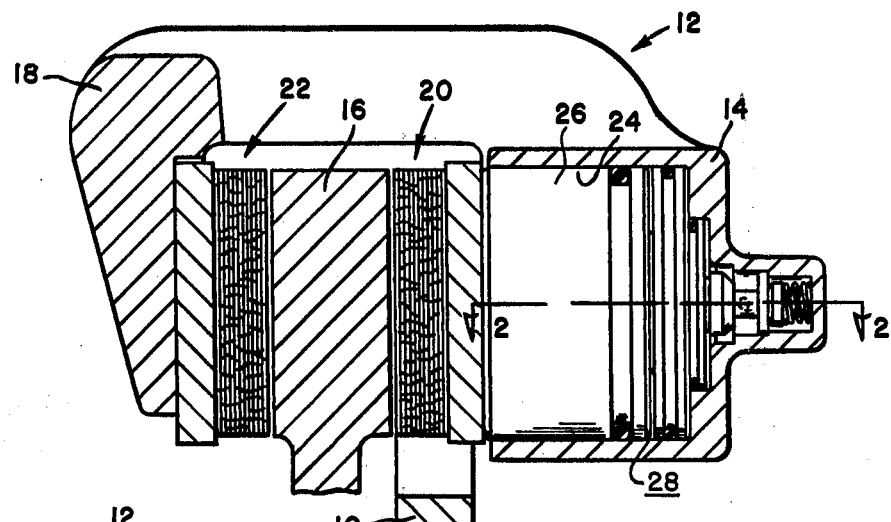
FIG. 1 is a front cross-sectional view of a disc brake assembly.

In the disc brake assembly of FIG. 1, a support member 10 is secured via conventional means to a portion of a vehicle adjacent a wheel assembly (not shown). The support member 10 movably carries a caliper 12 such that a first segment 14 is disposed on one side of a rotor 16 and a second segment 18 is disposed on the other side of the rotor 16. The caliper segments 14 and 18, or the support member 10 in combination with the caliper 12, cooperate to carry a pair of friction elements 20 and 22 on opposite sides of the rotor 16. The caliper segment 14 defines a stepped bore 24 for movably receiving a piston 26, the operation of which will be more fully described hereinafter. A pressure chamber 28 defined between the caliper segment 14 and the piston 26 receives fluid pressure from a pressure source, such as a master cylinder, to actuate braking. During braking the friction elements are biased by the caliper 12 and piston 26 into engagement with the rotor to retard rotation of the latter.

Figure 2:
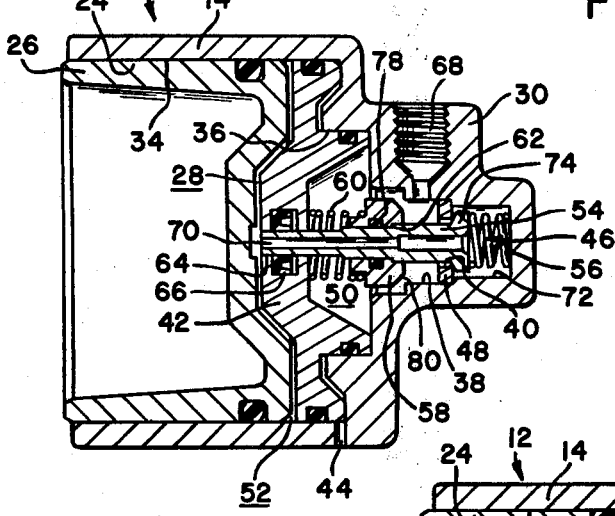
FIG. 2 is a cross-sectional view taken along line 2—2 of FIG. 1.

Turning to FIG. 2, the caliper segment 14 includes a housing 30 with an inlet port 68 leading to the stepped bore 24. The bore 24 includes a first diameter section 34, a second diameter section 36 and a third diameter section 38 and a fourth diameter section 40. The piston 26 slidably and sealingly engages the first diameter section. A plate 42 slidably and sealingly engages the first and second diameter sections 34 and 36, respectively, while the portion of bore 24 between the first and second diameter sections and opposing the plate 42 is vented to atmosphere via port 44. A valve assembly 46 is normally biased to a first position, as illustrated in FIG. 2, in spaced relation to the third diameter section 38 and in engagement with the fourth diameter section 40. The fourth diameter section can be formed from a ring 48, as shown, or from an integrally formed portion of housing 30.

In accordance with the invention the plate 42 separates the pressure chamber 28 into a first cavity 50 and a second cavity 52. The valve assembly 46 is substantially disposed within the first cavity 50. The valve assembly includes a pilot member 54 biased by spring 56 to seal against the fourth diameter section 40 and a sleeve 58 biased by spring 60 toward the third diameter section 38. A shoulder 62 on the pilot member 54 maintains the sleeve spaced from the third diameter section, provided the pilot member 54 is in engagement with the fourth diameter section 40. The spring 56 includes a stronger spring constant than the spring 60.

The plate 42 includes an opening 64 for receiving an end of the pilot member and a U-cup seal 66 carried by the plate engages the pilot member to prevent fluid communication from cavity 50 to cavity 52 via the interface between the pilot member and the plate. The U-cup seal does permit fluid communication from the cavity 52 to the cavity 50 when the fluid pressure in cavity 52 is greater than in cavity 50.

Figure 3:
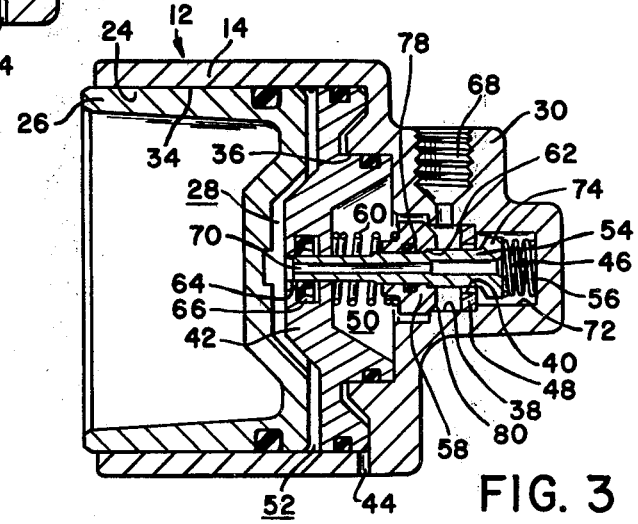
FIG. 3 is a view similar to FIG. 2, showing the valve assembly in an actuated condition.

The inlet 68 leads to the third diameter section 38 so that fluid pressure is communicated to the first cavity 50 from the inlet when the sleeve 58 is spaced from the third diameter section 38, as shown in FIG. 2. The pilot member 54 includes an axially extending opening 70 to communicate the inlet 68 with the second cavity 52 when the sleeve 58 is engaging the third diameter section 38 and the pilot member 54 is spaced from the fourth diameter section 40, as shown in FIG. 3.

As clearly shown in FIG. 2, a cutout 72 to the right of the fourth diameter section 40 provides for an enlarged head 74 of pilot member 54 to move away from section 40. The dimensions of the diameter sections 34, 36, 38 and 40 from the first to the fourth are progressively smaller and the diameter across the openings formed by seal 66 is smaller than the fourth section 40 to define a differential area against which the fluid pressure within cavity 50 acts to oppose the force of spring 56.

The sleeve 58 carries a seal 78 slidably engaging the pilot member 54 and a tapered leading edge 80 is radially aligned with the third diameter section 38. When the pilot member 54 is moved to the right, as shown in FIG. 3, the tapered leading edge 80 is engageable with the end of the diameter section 38 to separate the inlet 68 from the portion of the cavity 50 to the left of section 38.

MODE OF OPERATION

During nonbraking the piston, plate and valve assembly are disposed in the position illustrated in FIG. 2. Upon an initial brake application, fluid pressure is communicated to the first cavity 50 via the inlet 68 and past the clearance between the edge 80 and section 38. initial fluid pressure within cavity 50 acts against the plate 42 within the second diameter section 36 to move the plate 42 and piston 26 to the left. This movement of the plate and piston causes the caliper to take up the clearance existing between the rotor and pair of friction elements. Continued braking increases the fluid pressure within cavity 50 to bias the pilot member 54 to move to the right against spring 56, so that the pilot member 54 and sleeve 58 move to the position shown in FIG. 3. In this position fluid pressure from the inlet 68 is communicated to the second cavity 52 via passage 70 while the initial fluid pressure within cavity 50 is trapped to the left of section 38 due to the edge 80 being in engagement therewith. Fluid pressure within cavity 52 acts against piston 26 across diameter section 24 and against plate 42 across diameter section 24. Because the fluid pressure within cavity 50 is trapped, the force acting against plate 42 from fluid pressure within cavity 52 is substantially offset so that the plate remains substantially stationary. However, the force acting against piston 26 creates a reaction force on the caliper 12 to fully engage the friction elements with the rotor.

During initial braking the piston and plate advance to the left at a first rate of speed determined by the fluid displacement to cavity 50 acting across diameter section 36. When the valve assembly 46 is shifted to the right the fluid pressure in cavity 52 causes the piston to advance to the left at a second rate of speed determined by the fluid displacement to cavity 52 acting across diameter section 34. Because the diameter section 36 is smaller than diameter section 34, the rate of speed of the piston and plate during initial braking will be faster than the rate of speed for the piston during continued braking or after the valve assembly shifts to the right.

I claim:

1. In a disc brake assembly having a caliper cooperating with a pair of friction elements to move the latter from a rest position to a braking position in engagement with the disc, the caliper defining a bore for movably receiving a piston, and the piston cooperating with the caliper to substantially define a chamber for receiving fluid pressure, characterized by said chamber including pressure responsive means imparting a first rate of movement to said piston as the fluid pressure increases to a predetermined value, and said pressure responsive means imparting a second rate of movement to said piston when the fluid pressure is above the predetermined value, said pressure responsive means including a valve assembly and a plate, said plate separating said chamber into a first cavity and a second cavity, and said valve assembly communicating the fluid pressure to said first cavity when the fluid pressure is below the predetermined value and communicating the fluid pressure to said second cavity when the fluid pressure is above the predetermined value, said valve assembly comprising a first valve normally closing the second cavity to the fluid pressure and a second valve normally opening communication of the fluid pressure to the first cavity.

2. The disc brake assembly of claim 1 in which said first valve extends through an opening on said second valve to movably support said second valve, said first valve defining a shoulder against which said second valve is biased.

3. The disc brake assembly of claim 1 in which said first valve is movable in response to the fluid pressure to open communication of the fluid pressure to the second cavity and said second valve is movable with said first valve to close communication of the fluid pressure to the first cavity.

4. A fluid motor for a disc brake assembly comprising a housing having a stepped bore, a piston movably disposed within said stepped bore and cooperating with said housing to substantially define a chamber for receiving fluid pressure, a plate movably disposed within said chamber and sealingly engaging said stepped bore to separate the chamber into a pair of cavities, and a valve assembly responsive to the fluid pressure within the chamber to communicate the fluid pressure to one of said cavities when the fluid pressure is below a predetermined value and to the other of said cavities when the fluid pressure is above the predetermined value, said plate being movable in response to fluid pressure within said one cavity to impart movement to said piston at a first rate of travel and said piston is movable in response to fluid pressure within said other cavity at a second rate of travel which is less than the first rate of travel, said one cavity being sealingly isolated from said other cavity when the fluid pressure is communicating with the latter, and the isolated fluid pressure within said one cavity preventing movement of said plate away from said piston.

5. A fluid motor for a disc brake assembly comprising a housing having a multiple stepped bore, a piston sealingly engaging a first diameter portion of said multiple stepped bore and cooperating with said housing to substantially define a chamber for receiving fluid pressure, a plate sealingly engaging the first diameter portion and a second diameter portion of said multiple stepped bore, said plate separating said chamber into a pair of cavities, a valve assembly normally spaced from a third diameter portion of said multiple stepped bore to communicate fluid pressure to one of said pair of cavities, said valve assembly normally engaging a fourth diameter portion of said multiple stepped bore to close communication of fluid pressure to the other of said pair of cavities, and said valve assembly being movable in response to the fluid pressure to engage the third diameter portion and separate from the fourth diameter portion when the fluid pressure reaches a predetermined value.

6. In a fluid motor for a disc brake assembly having a housing defining a bore for receiving fluid pressure and a piston movably disposed within said bore to move from a nonbraking position to a braking position during a brake application, characterized by a plate movably disposed within said bore and a valve assembly disposed within said bore, said valve assembly including a first position wherein the fluid pressure acts against said pate to move said plate and said piston within said bore and a second position wherein the fluid pressure acts against said piston to move said piston relative to said plate, said bore being stepped to define a plurality of diameter sections therein and said valve assembly is engageable with one of said diameter sections in the first position and with another of said diameter sections in the second position.

7. In a fluid motor for a disc brake assembly having a housing defining a bore for receiving fluid pressure and a piston movably disposed within said bore to move from a nonbraking position to a braking position during a brake application, characterized by a plate movably disposed within said bore and a valve assembly disposed within said bore, said valve assembly including a first position wherein the fluid pressure acts against said plate to move said plate and said piston within said bore and a second position wherein the fluid pressure acts against said piston to move said piston relative to said plate, said bore being stepped to define a plurality of diameter sections therein and said plate is sealingly engageable with at least two of said diameter sections.

8. The fluid motor of claim 7 in which the portion of said stepped bore between said two diameter sections is vented to atmosphere.

9. In a fluid motor for a disc brake assembly having a housing defining a bore for receiving fluid pressure and a piston movably disposed within said bore to move from a nonbraking position to a braking position during a brake application, characterized by a plate movably disposed within said bore and a valve assembly disposed within said bore, said valve assembly including a first position wherein the fluid pressure acts against said plate to move said plate and said piston within said bore and a second position wherein the fluid pressure acts against said piston to move said piston relative to said plate, said plate including an opening and said valve assembly extending through said opening, said plate cooperating with said housing bore to substantially define a pair of cavities and said valve assembly cooperating with said plate to permit fluid communication from one of said pair of cavities to the other cavity and to prevent fluid communication from said other cavity to said one cavity.

* * * * *